3,377,467
PHOTOMETRIC READOUT SYSTEM
John J. J. Staunton, Oak Park, and Roy E. Boostrum, Elmhurst, Ill., assignors, by mesne assignments, to The Perkin-Elmer Corporation, Norwalk, Conn., a corporation of New York
Filed Apr. 6, 1964, Ser. No. 357,409
18 Claims. (Cl. 235—92)

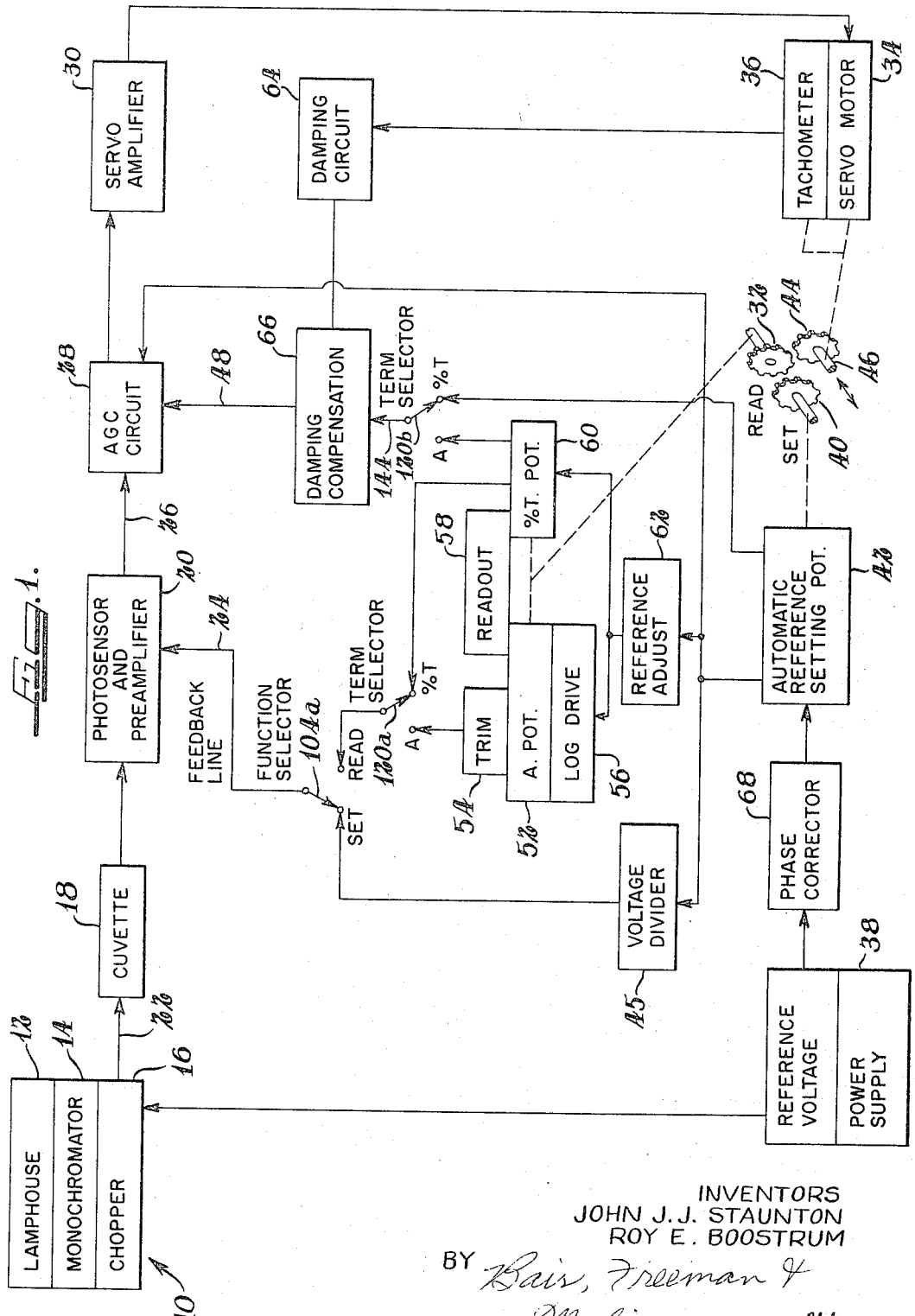

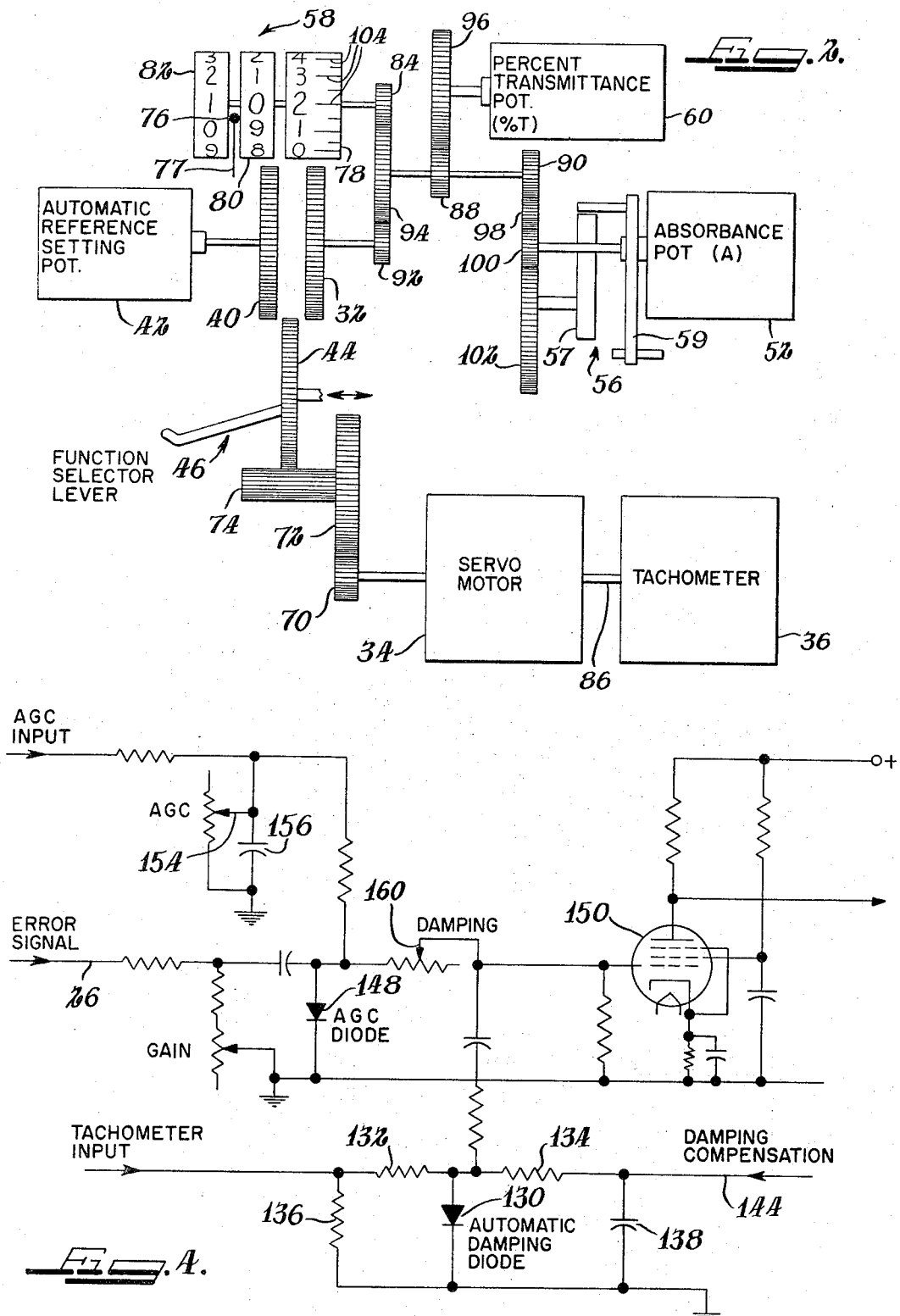

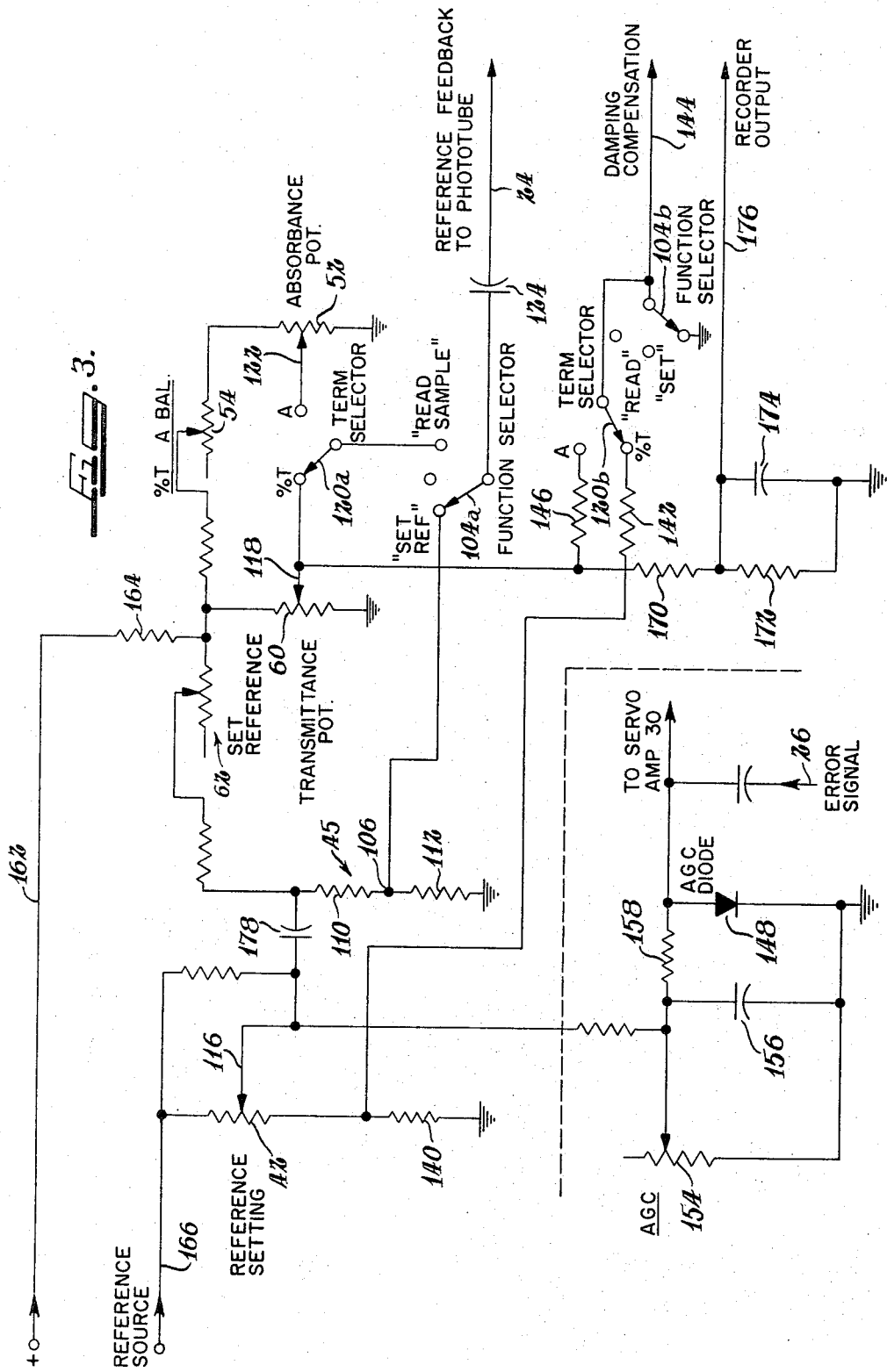

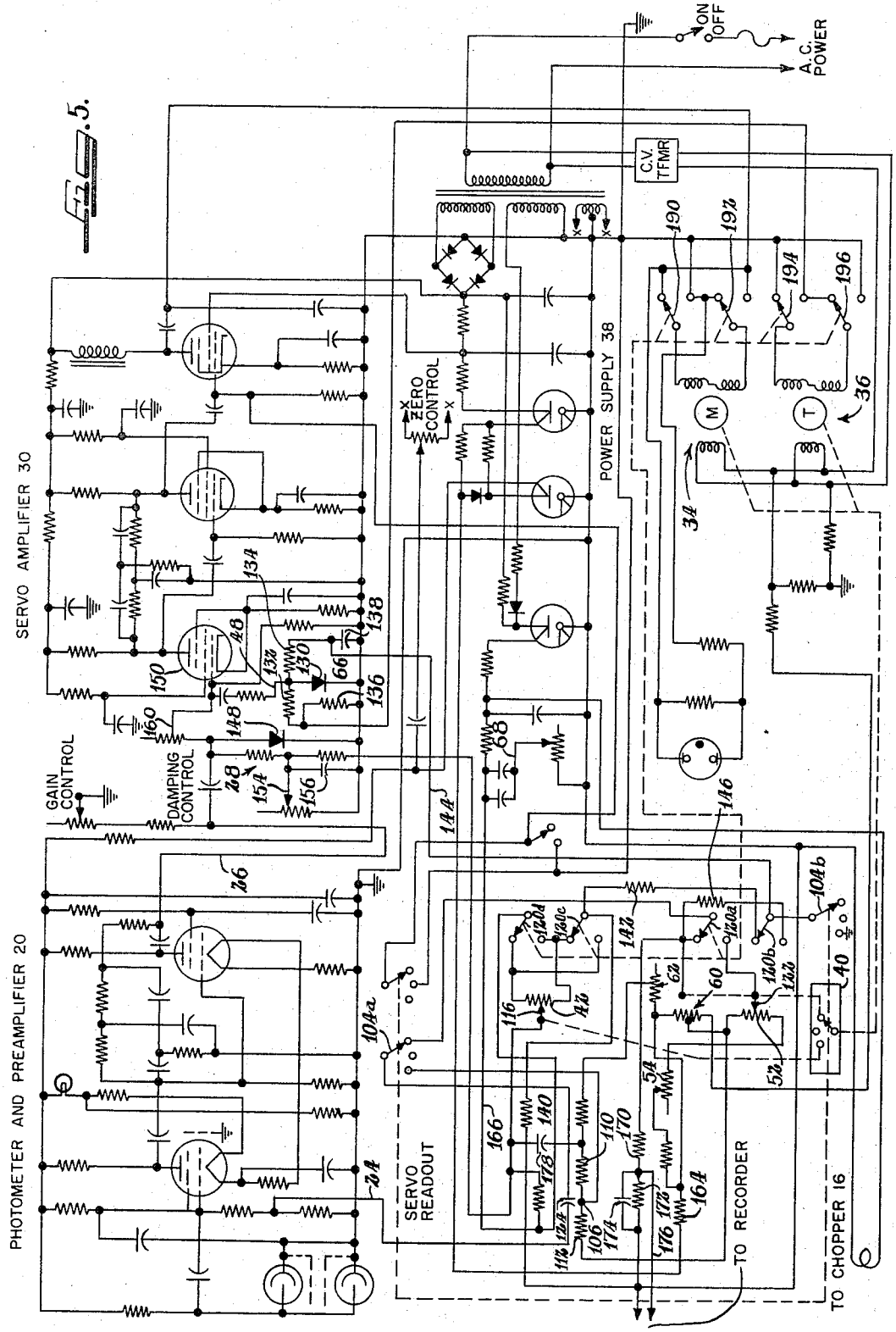

ABSTRACT OF THE DISCLOSURE

A digital readout used with a photometric system which provides linear photometric readout information in either percent transmittance (T) or absorbance (A) without requiring any mechanical conversion of the photometric system. Further features of the digital readout include automatic adjustment of reference setting; a decimal point marker coupled to the transmittance-absorbance switching means and movable relative to said digital readout when the system is switched from one type of readout to the other; provision of a signal to an external recorder which also provides readout linearly in percent transmittance or absorbance; means to provide equivalence between 100% transmittance, zero absorbance and the reference point; means for reversing the direction of rotation of the servo means when switching from transmittance to absorbance readout; the provision of a linear-log drive which permits the use of a linear digit readout with a linear potentiometer to readout a logarithmic function; and means to provide variable damping during absorbance measurement.

This invention relates generally to spectrophotometers, and more particularly to a new and improved spectrophotometer apparatus providing linear digital readout in terms of either transmittance or absorbance, which may be selected merely by the actuation of a simple switching mechanism.

Spectrophotometry is well known as the science of determining the concentration of a particular chemical substance by measuring its light absorbing properties. Spectrophotometer instruments normally include a light source comprising a monochromator which causes a narrow band of light to be radiated through the sample, and a photometer which measures the light that is not absorbed by the sample and is allowed to pass therethrough. Generally, the procedure for spectrophotometric analysis consists of comparing the absorbance (A) or the transmittance (T) of the sample to that of a known reference solution.

It is conventional in the use of spectrophotometers and colorimeters, to present the photometric readout information in the form of percent transmission, where 100% T is the transmission of a reference sample, or in the form of absorbance units, where zero A is the absorbance of the reference sample. In the case of a directly amplified system, the signal from the optical detector, as for example, a photo tube, is amplified by a linear amplifier and is applied to a meter whose deflection indicates the %T directly on a scale. Commonly, another scale may be juxtaposed to the %T scale to give a direct reading in A units. Because absorbance is the reciprocal of the logarithm to the base 10 of transmittance, the absorbance scale then is a reversed logarithmic scale whose non-uniform calibration makes accurate reading both difficult and slow for the operator.

Another known type of photometric readout derives an electrical signal from a calibrated variable resistance or potentiometer slide wire and feeds this signal back against the photosensor signal, either before or after amplification. The resulting difference of these two signals, or the error signal, is amplified if necessary and is applied to a null indicating device such as a meter. Thus, by adjusting the potentiometer slide wire contact to reduce the error signal to zero, it is possible to read the %T or A value from a dial or other suitable scale attached to the slide wire.

In recent times, there has been an increased demand for greater speed and convenience in spectrophotometry, and this has led to the use of motor driven servo circuits for the function of effecting the null balance described above. In such instances, the motor, driven by the amplified error signal, drives the potentiometer slide wire contact towards the null position and stops at the null position when the error signal falls to zero.

It also is known to utilize such servo motor driven systems for operating recorder readouts where the motor simultaneously drives the slide wire contact and also a recording pen. In such devices, the recording pen writes a continuous record of the slide wire contact position on a suitable chart paper. Such a record usually is linear when the readout is recorded in percent transmittance units, but if linearity is desired for recording in absorbance units, additional means must be provided for either switching from the linear to a more complicated and less exact logarithmic slide wire or for interposing between the slide wire and the recording pen, a logarithmic converter such as a pair of non-circular logarithmic gears, cams, or other suitable mechanical converting device. The prior art systems of this type normally read only in absorbance units although provision may be made for mechanically disconnecting the logarithmic converter to permit readings in percent transmittance units in addition. Such a mechanical change over, as by replacing the logarithmic gears or cams, obviously is a slow and involved feature which requires careful indexing to insure that the zero absorbance point and the 100% transmittance point accurately register at the same position on the slide wire.

Those skilled in the art appreciate that in the use of the above described readout systems, the requirement that the user accurately adjust the 100% transmittance point or zero absorbance point against a reference has been a serious deterrent to the widespread adoption of such systems. As a result, there has been an increased shift to the use of a double beam photometric system of the type which alternately compares the reference and a sample at a rate of 10 or more times per second. However, such systems require a more complex optical layout to permit this comparison and they also require a synchronized switching device in the amplifier or readout to permit the system to adjust its own 100% transmittance point when the reference is being viewed and to adjust its readout value when the measured sample is being viewed. Still further, the double beam system normally is more costly than a single beam system and it is much slower when it comes to the measurement of repetitive samples because it cannot accept more than one sample and a reference at any time for measurement. On the other hand, the single beam system can accept several samples which can rapidly be substituted for each other as fast as the readout can respond. On a long run involving serial samples, the single beam system can be over twice as fast as any double beam system.

Due to the faster speed and lower cost of the single beam system, several attempts have been made in the prior art to overcome the objectionable requirement for manual setting of the reference value by providing means to effect an automatic adjustment of this value. One such device, as illustrated in United States Letters Patent No. 3,014,401 consists of an elaborate servo-driven device which adjusts the 100% T level by adjusting the slit widths of the spectrophotometer with which it is associated. Another such device, which is more like a double beam than a single beam system, is illustrated in United States Letters Patent No. 2,984,146 and adjusts the excitation of a photomultiplier tube which receives the light beam. In practice, the latter device lacks the advantages of the single beam system. Therefore, despite the desirability of an automatic reference setting device in a single beam system, no such device has been made commercially known and available to the knowledge of the inventors herein prior to their own invention as specifically described hereinbelow.

Accordingly, it is a general object of this invention to provide a new and improved single beam photometric system having automatic adjustments of the reference setting.

It is a more particular object of this invention to provide a unique system for photometric readout which comprises a novel combination of means providing the advantages of a digital readout, an automatic reference setting means, means for reading out linearly in either percent transmittance or absorbance without mechanical conversion of the system, and a novel circuit cooperating with the above features for providing signal voltage to an external recorder which also may read out linearly in either percent transmittance or absorbance.

It is a further object of this invention to provide a new and improved single beam photometric system which may be operated by relatively unskilled personnel as the operator is not required to make any adjustments other than to move a simple lever between two extremes to selectively provide linear readout in either percent transmittance units or absorbance units.

It is a still further object of this invention to provide a novel photometric readout system, as above, which is characterized by its increased speed of operation, greater accuracy, and ease of readout on multiple, repetitive samples.

It is another object of this invention to provide a unique photometric readout system which completely eliminates the previous requirements of making mechanical changes or conversions in the servo system when switching from percentage transmittance readout to absorbance readout, thereby avoiding indexing problems and increasing the mechanical accuracy of the servo system.

It is still another object of this invention to provide a new and improved single beam photometric readout system which is characterized by its extreme flexibility, linearity in all modes of operation, and simplicity of use which requires a minimum of skill or judgment, on the part of the operator.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawing in which:

FIGURE 1 is a block diagram of one illustrative embodiment of spectrophotometer embodying the features of the present invention;

FIGURE 2 is a diagram illustrating the mechanical arrangement of the servo mechanism and readout portion of the system shown in FIGURE 1;

FIGURE 3 is a simplified schematic circuit diagram of the basic AC and DC servo readout circuitry of the present invention;

FIGURE 4 is a simplified schematic diagram of the basic damping and gain control circuitry in the servo amplifier input; and FIGURE 5 is a schematic circuit diagram of one illustrative commercial embodiment of a spectrophotometer embodying the present invention.

Referring now to the drawing and more particularly to the block diagram illustration of FIGURE 1, there is shown an illustrative spectrophotometer of the type which has recently been made commercially available under the name "Coleman Model 30 Autoset Spectrophotometer." As the description of this invention proceeds, it will become apparent to those skilled in the art that the illustrative embodiment comprises a combination of four major circuit portions, namely, a single motored servo-driven photometric system with digital counter readout; an automatic reference setting device; linear readout means for both percent transmittance and absorbance units; and a unique recorder drive circuit. It further will be appreciated as the description of the invention proceeds that the latter three circuit portions cooperate with each other and with the first circuit portion in a novel manner to produce a new and highly advantageous result, and that each of the latter three circuit portions can by itself be combined with the first circuit portion in a novel manner to produce a new result, and still further that each of the latter three circuit portions comprises within itself novel features as further described hereinbelow.

Referring now specifically to FIGURE 1 of the drawing, it can be seen that the optical system or light source 10 advantageously may comprise a lamp house 12, a monochromator 14, and a light chopper 16. It will be evident to those skilled in the art, that the specific details of the light source 10 do not form a part of the present invention and that other types of light sources and optical systems readily may be utilized for radiating the chopped light through the reference solution or sample to be measured contained in the cuvette 18.

The chopped light 22 transmitted through the cuvette 18 is sensed by a suitable photosensor 20, such as a photo tube or the like, and the electrical signal developed by the photosensor is compared with a feedback signal 24, the difference therebetween constituting an error signal 26 present at the output of the photosensor and preamplifier 20.

The error signal 26, after amplification in the preamplifier, is applied to an automatic gain control circuit 28 where its level is adjusted to a value suitable for the servo amplifier 30. If desired, in the manner explained in greater detail hereinbelow, a damping signal 48 also may be added to the automatic gain control circuit 28 for the purpose of controlling the speed and overshoot of the servo motor 34. The combined signal output of the automatic gain control circuit 28, after amplification by the servo amplifier 30, then is applied to the servo motor 34, as shown in FIGURE 1.

In the manner well understood by those skilled in the art, the servo motor 34 is caused to rotate by the output signal from the servo amplifier 30 and when it does so, it will cause the rotation of the read gear 32 operatively coupled to the absorbance potentiometer 52 and percent transmittance potentiometer 60, or the set gear 40, operatively coupled to the automatic reference setting potentiometer 42, depending upon the particular position of the servo motor output drive gear 44 which is determined by the function selector lever 46. As explained in greater detail with respect to FIGURE 2 of the drawing, the function selector lever 46 serves as a gear shift to cause the servo output drive gear 44 to be meshed with the read gear 32 or to be meshed with the set gear 40 in accordance with the system function desired by the operator.

As shown in FIGURE 1, if the function selector lever 46 is set to mesh the drive gear 44 with the read gear 32, the servo motor 34 will drive the percent transmittance potentiometer 60 at the same time as the digital counter readout 58 and in linear angular relation therewith. The read gear 32 also drives the absorbance potentiometer 52 but the rotation of the latter is not in linear relation with the digital counter readout 58 but is modified by a logarithmic conversion mechanism 56 to generate the absorbance function in the output of the absorbance potentiometer 52. This output, or that of the percent transmittance potentiometer 60, is returned by the feedback line 24 to the photosensor housing 20 as a feedback signal when a sample in the cuvette 18 is being measured. When the servo motor drive gear 44 is meshed with the set gear 40 during the reference setting function, the feedback signal over the feedback line 24 is derived from the automatic reference setting potentiometer 42, as will be described in greater detail hereinbelow.

The phase of the error signal at the servo motor 34 results from the sense of the error signal, i.e., the direction in which the error signal is off the null position. This phase determines the direction of rotation of the servo motor 34 in a well understood manner, driving the servo motor 34 so that the value of the feedback signal originating in the particular potentiometer being driven by the servo motor will approach that of the measuring signal from the photosensor 20. When the feedback signal in the feedback line 24 becomes equal to the measuring signal applied to the photosensor 20 from the cuvette 18, the difference or error signal becomes zero and the servo motor 34 stops its rotation. Similarly, at this point, the digital counter readout 58 and the driven potentiometers also come to rest, with the digital counter readout 58 serving to indicate the value of the measuring signal.

Those skilled in the spectrophotometer art will appreciate that the operation described above represents the basic self-balancing action of the servo system. The remaining functions shown in the block diagram of FIGURE 1 are auxiliary to this self-balancing operation and may be briefly described at this point, with the details of the novel features being more fully disclosed hereafter. Power to drive the light chopper 16, which may be any conventional chopping mechanism known in the art, as for example, a vibrating reed, is derived from a stabilized power supply 38. The same power supply also delivers an AC signal to the measuring potentiometers 52 and 60 through a phase corrector 68 and the automatic reference setting potentiometer 42. The block diagram of FIGURE 1 also includes a damping system which serves the usual function of bringing the servo motor 34 to rest without overshoot when null is reached. Towards this end, a signal proportional to angular velocity is generated by a tachometer 36 which is coupled to and rotates with the servo motor 34. The output signal generated by the tachometer 36 opposes the servo motor rotation and takes over when the null point is approached to bring the servo motor 34 to a full stop. Because the required damping from the damping circuit 64 varies in the manner depending on which potentiometer is providing the feedback signal, a damping compensation circuit 66 is provided between the damping circuit 64 and the automatic gain control circuit 28 to provide damping compensation in the manner described in greater detail hereinbelow.

The specific circuit details of the novel system described above with respect to the block diagram of FIGURE 1 are particularly illustrated in the electrical circuit schematic and wiring diagram of FIGURE 5 of the drawing. FIGURE 5 shows the circuit details of one commercial embodiment of the present invention and the circuit components of FIGURE 5 similar to the components shown in block form in FIGURE 1, have been marked with identical reference numerals. Those skilled in the art will appreciate that a number of the circuit components and their operation in the schematic shown in FIGURE 5 are conventional and need not be described in detail herein. However, the present inventive circuit does include several highly unique and novel features, and for simplicity of illustration and to facilitate the understanding thereof, these novel circuit features are more basically shown in FIGURES 2, 3 and 4 of the drawing. Accordingly, the specifically novel features of the invention now will be described in detail with reference to these basic drawings of FIGURES 2, 3 and 4, although it will be fully appreciated that the same features are shown in greater detail in the overall circuit schematic drawing of FIGURE 5.

The mechanical arrangement of the servo system control of the potentiometers and readout is shown in FIGURE 2 of the drawing. The driving signal from the servo amplifier 30 is applied to a reversible split-phase servo motor 34 which has a tachometer 36 operatively coupled thereto by means of the common shaft or gearing 86. As explained above, the tachometer 36 serves to generate the tachometer signal utilized by the damping system to bring the servo motor 34 to rest without overshoot when the null is reached.

In accordance with the construction of this particular illustrative embodiment of the invention, both of the servo motor and tachometer devices have separate field excitation. The driving signal from the servo amplifier 30 is applied to the split-phase coils of the servo motor 34 in the usual manner and the tachometer signal likewise is derived from the split-phase coils of the tachometer 36. The rotational output of the servo motor 34 is stepped down through a chain of gears 70, 72, 74, 44 and others depending upon the position of the function selector lever 46, to turn the shaft of the potentiometer slide wires and the readout digital counter 58 at a reduced speed.

In accordance with a highly unique and novel feature of the present invention, at one stage of the gear train reduction, a sliding gear shift exemplified by the drive gear 44 operatively coupled to the function selector lever 46 is provided to selectively engage with either the set gear 40 to drive the automatic reference setting potentiometer 42 slide wire or to engage with read gear 32 to drive the measuring potentiometer slide wires, such as the percent transmittance potentiometer 60 slide wire and the absorbance potentiometer 52 slide wire to effect the measuring function. Electrical switching means is provided to be actuated simultaneously with the operation of the function selector lever 46 to effect the changes in the electrical circuit appropriate to the reference and to the measuring positions of the gear shift 44.

Thus, it can be seen from FIGURE 2 that when the system is in the measuring position, the gear train from the servo motor 34 drives the digital counter readout 58 through the gears 84, 94 and 92 coupled to the read gear 32. Advantageously, the digital counter readout 58 may be comprised of a three wheel counter marked with 10 digits on each wheel. Thus, the wheel 82 may serve to supply the most significant digit, the wheel 80 may serve to supply the intermediate digit, and the wheel 78 may serve to supply the least significant digit.

It also will be noted with respect to the digit wheel 78 that interpolation marks 104 may be provided thereon to permit still further accurate reading of the measured value. As such, the digital readout counter 58 can read percent transmittance directly to the nearest percent, with the least significant percent digit being indicated on the counter wheel 78 and the interpolation marks 104 indicating fractional parts thereof. Manifestly, the digital counter readout 58 may also, by merely shifting the decimal point 76, read absorbance over the range from zero to values of 1.50 A. or higher, as required. In accordance with another novel feature of the present invention, the shift of the decimal point 76 may be advantageously effected by coupling a mechanically translatable decimal point marker, such as that shown by the reference numeral 77 in FIGURE 2, to the electrical switch which changes the circuit over from percent transmittance to absorbance readout.

The gear train at the output of the servo motor 34 also drives a linear potentiometer slide wire 60 which produces the %T feedback signal and also the recorder drive signal. This gear train comprises the gears 96, 88, 94, and 92 which is coupled to the read gear 32 at the gear shift portion. In actual practice, it has been found desirable to utilize a three turn helical potentiometer for the percent transmittance potentiometer 60, although those skilled in the art will readily appreciate that other types of potentiometers may be utilized for this purpose if desired. A similar linear potentiometer slide wire is utilized for the absorbance potentiometer 52 to produce the absorbance feedback signal. As explained in greater detail hereinbelow, the absorbance potentiometer 52 is driven from the gear train comprised of the gears 32, 92, 94, 90, 98, 100, and 102 through a mechanical logarithmic converter 56 which serves to modify the rotation of the absorbance potentiometer so that it will not be in linear relationship with the servo motor rotation.

At this point, it will be advantageous to consider the operation of the automatic reference setting potentiometer 42. In the operation of the invention, the operator desiring to set reference will first place the reference sample in the cuvette 18 so as to be in the path of the chopped light beam from the optical source 10. The operator then moves the function selector lever 46 which shifts the servo drive gear 44 to mesh with the set gear 40. The function selector lever 46 also is coupled to certain electrical switches, shown as 104a and 104b in FIGURES 3 and 5, to connect the feedback path 24 leading to the photosensor 20 to a point 106 on the voltage divider 45. As shown in FIGURES 3 and 5 of the drawing, the voltage divider 45 advantageously is comprised of the resistors 110 and 112 such that the voltage divider 45 simulates the measuring slide wire, either the %T slide wire 60 or A slide wire 52, as it would be if set at 100%T or zero A. Advantageously, an adjustable trimmer 62 is provided to make the 100%T exactly equivalent or the electrical image of the point 106 on voltage divider 45. A further adjustable trimmer 54 is provided to make the zero A and the 100%T points equivalent.

Consider that the electrical switch 120, shown in FIGURES 1, 3 and 5, and labeled as the Term Selector is in the %T position. At this time, the servo motor 34 will receive a signal that will drive the potentiometer slider 116 of the reference potentiometer 42 in such a direction that the voltage at the point 106 will approach that which gives balance for the reference sample. At the same time, the value of the current in the slide wire for the %T potentiometer 60, which is in parallel with the divider 45, will also change in the same direction as that in the divider. When balance is reached, the servo motor 34 will stop. If the function selector switches 104a and 104b are then returned to the READ position, the servo motor 34 will again start and drive the slider 118 of the %T potentiometer 60 to balance, the feedback signal now being taken from the slider 118 through the contact "READ SAMPLE" on the switch 104a. When balance is attained, the slider 118 will be at the point on the %T potentiometer 60 corresponding to 100%T, and the digital counter 58 will indicate that figure.

Had it been desired to always set the reference at 100%T, the divider 45 could have been eliminated and a tap on the potentiometer 60 placed at 100%T used to derive the reference feedback signal. However, this fixed connection would have the disadvantage that the linearity of the potentiometer 60 may have been disturbed by the presence of a tap on its winding. Furthermore, in actual use, it may be desirable to set reference at some point other than 100%T to compensate for known difference of the reference sample. Hence, it has been found advantageous in the construction and operation of the present invention, to use the divider 108 which acts as the electrical image of the percent transmittance potentiometer 60.

Another advantage of using the voltage divider 45 in the present circuit is that it serves to greatly reduce the wear in the immediate vicinity of the 100%T point of the transmittance potentiometer 60. Those skilled in the art will appreciate that repeated balancing operation to the same value on a potentiometer will concentrate the wear on the slide wire in a region of two or three turns. Eventually, this may cause non-linearity of the potentiometer or malfunction due to wear or failure. Thus, it is a novel feature of the present invention to utilize the voltage divider 45 as a substitute for the percent transmittance potentiometer during reference setting to thereby reduce the wear thereon by a significant factor. Furthermore, a less expensive untapped potentiometer 60 can be used, the switching is simplified, and operator influence on the reference setting is eliminated since the operator does not observe the progress of the balance operation and run the risk of cutting it short prematurely. In the course of a routine operation, for which the present inventive system is highly advantageous, it is of definite value to have the system perform this particular operation in a "blind" manner, i.e., without reading out on the counter during balancing. Blind operation of this type encourages the operator to relax and let the automatic do the work, and to accept the result as it then appears on switching back to the READ position. In the course of a long series of repetitive operations, the reduction of operator fatigue by the elimination of such decisions is extremely valuable.

As stated heretofore, one of the most unique and advantageous features of the present invention is its ability to make a linear absorbance reading available on the digital counter readout 58, instead of limiting the latter to merely reading percent transmittance. In the analytical field, the use of absorbance has become increasingly important because of the linear relationship between the concentration of the absorbing constituent of a sample and absorbance. This relationship has long been well known and recognized as important in the art with the result that it has been a practice of instrument manufacturers to parallel the linear %T scale which the linear photosensor normally generates with the non-linear reciprocal log scale of absorbance. On a meter, this can readily be done but it does have the serious disadvantage in that the absorbance scale is excessively spread out at low absorbance values and is unacceptably cramped above an absorbance of 1.0 (10%T). In addition, the non-linear reciprocal log scale of absorbance is presented in a reversed form and is difficult to read for the operator.

One method for generating a more linear absorbance readout which comes within the scope of this invention is to use a tapered logarithmic winding on the slide wire but admittedly this practice is a relatively expensive one. In accordance with a preferred feature of this invention for generating a more linear absorbance readout, a mechanical linear-log converter 56 is interposed between the digital counter readout 58 and the absorbance potentiometer 52. This mechanical linear-log converter 56 is particularly illustrated in FIGURE 2 of the drawing as a non-circular logarithmic gear or cam 57, such as is well known in the art and which need not be further described in detail herein. It will be appreciated that by the use of such a mechanical linear-log converter mechanism, the linear absorbance potentiometer 52 comes to balance on the linear photosensor signal to convey desired logarithmic absorbance information to the digital readout counter 58 without the need of mechanically removing and replacing the converter mechanism with its attendant requirement of proper indexing which has been characteristic of the prior art attempts to solve this problem.

Thus, those skilled in the art now will appreciate that one of the most important and advantageous features of the present invention is to provide a spectrophotometer readout system, which, for the first time, makes it possible on a digital counter to provide an immediately available and readily selectable readout in either percent transmittance or absorbance values. Referring specifically to FIGURE 3, it can be seen that this selection may be made by moving the term selector switch 120 to the A contact position, thereby connecting the slider 122 of the absorbance potentiometer 52 to the feedback line 24. This enables the absorbance potentiometer value to be fed back through the term selector switch 120a, the function selector switch 104a, and capacitor 124, to the reference feedback line to the photosensor 20.

After the term selector switch 120 has been positioned, it is necessary to set reference again. This is required because the absorbance scale, although read out on the same digital counter readout 58 as percent transmittance, is inverted with respect to the slider position on the absorbance potentiometer 52. In absorbance measurement, the zero readout, corresponding to 100%T, is well up toward the ungrounded end of the absorbance potentiometer 52; while the high end of the absorbance scale, approaching zero percent transmittance, is near the grounded end of the absorbance potentiometer 52. If the digital counter 58 were indicating zero when the term selector switch 120 was in the %T position, a positive drive signal to the servo motor 34 would be required to drive the percent transmittance potentiometer 60 and the digital counter 58 up scale.

On the other hand, if the term selector switch 120 is at the A contact to read absorbance, and the digital counter 58 is at zero, i.e., at a point remote from the grounded end of the potentiometer as shown in FIGURE 3. it will be necessary to apply a negative drive signal to the servo motor 34 to drive the digital counter 58 up scale and the absorbance potentiometer 52 down towards its grounded end.

Accordingly, it is a unique feature of this invention that the switches 190, 192, 194 and 196, as shown in FIGURE 5, are operated by the term selector switch 120 to reverse both the servo motor 34 and the tachometer 36 when the instrument is measuring absorbance. It also will be appreciated by those skilled in the art that this reversal of the servo motor 34 entails a reversal of the automatic reference setting potentiometer 42, and hence it is required that the reference be reset.

The above-described provisions for reversing the servo motor 34 and tachometer 36, as well as the automatic reference setting potentiometer 42, constitute a practical and quite unique means of overcoming the reversed scale difficulty encountered when both %T and A are to be measured on the same counter. In addition, this novel solution eliminates all requirements of gear changing such that the gears, always in mesh, do not need to be realigned or reindexed during changeover from %T to A, or vice versa, to make the counter scale assume the correct relation to the potentiometer rotational position. As stated above, this requirement of reindexing the gears is common to the prior art changeover methods and is a distinct disadvantage of such prior art systems. Another advantage to the approach of the present invention is that the gears being always in mesh can be maintained with minimum backlash to increase measuring accuracy.

In accordance with a further feature of this invention, as particularly illustrated in FIGURES 1, 3 and 5, further switch sections are provided on the term selector, as switch 120b, and on the function selector, as switch 104b, to change the amount of damping impressed on the servo motor 34 to match the differing requirements in the %T, A, and reference setting position of the system. The damping signal normally generated by the tachometer 36 may be greater than that required for this purpose, and therefore, as shown in FIGURE 4 of the drawing, the damping signal may be controlled by shunting out the undesired portion with a diode 130 connected to the tachometer 36 input. Advantageously, the automatic damping diode 130 has a DC bias applied thereto, thus controlling the diode as a variable resistor in the circuit comprised of the resistances 132, 134 and 136 plus the capacitor 138.

The basic damping control circuit is shown in FIGURE 4 of the drawing. When the servo motor 34 is operating the reference setting potentiometer 42, the inertia of the potentiometer and the gearing is low. At one end or the other of this potentiometer, however, depending on whether reference is being set for %T or A, the rate of change of feedback signal per turn of the potentiometer becomes quite rapid. This increased rate of change requires that the damping be high to enable the servo motor 34 to be stopped rapidly. When the system is in the reference condition, therefore, the switch 104b shown in FIGURE 3 will ground the bias to the automatic damping diode 130, thereby regulating the diode so that it will not shunt out any of the damping signals. The damping required when the system is balancing in the percent transmittance mode is less, and therefore, a bias is applied to the automatic damping diode 130 from the junction of the reference setting potentiometer 42 and the fixed resistor 140, through the resistor 142 and the switches 120b and 104b, as shown in FIGURE 3 of the drawing. The output of these switches through the damping compensation line 144 is applied to the automatic damping diode network as shown in FIGURE 4 to enable the proper bias to be applied to the diode.

When the system is measuring absorbance, then due to the non-linear coupling between the servo motor 34 and the absorbance potentiometer 52, a variable damping is required which roughly is inversely proportional to the indicated absorbance. It has been found in the operation of the present invention that the bias necessary to control this varying damping can be derived from the slider 118 of the percent transmittance potentiometer 60. This bias therefore is applied through the fixed resistor 146 and the switches 120b and 104b to the damping compensation line 144 in the manner described above. It will be appreciated that the biases applied to the automatic damping diode 130 in the manner just described are DC voltages, and the presence of this DC bias voltage in an AC signal circuit will be explained in greater detail hereinbelow.

If the error signal level were to vary greatly as compared with the damping signal, a satisfactory damping would be difficult to obtain. As such, in accordance with a feature of this invention, means are provided to keep the error signal at approximately a constant level. The circuit which enables this highly desirable operating mode to be attained is particularly shown in FIGURE 4 of the drawing.

As there shown, the AGC diode 148 shunts the input to the tube 150 of the servo amplifier 30 when a DC bias is applied thereacross. As such, the level of the error signal is reduced when it is presented to the input grid of the amplifier tube 150. The DC bias which controls the AGC diode 148 is derived from the slider 116 of the reference setting potentiometer 42. As shown in FIGURE 3 of the drawing, the slider 116 is connected through the resistor 152 to the AGC circuit comprised of the AGC potentiometer 154, the capacitor 156, the resistor 158 and the AGC diode 148. Since the position of this slider 116, as has been described above with respect to the automatic reference setting function, is a function of the measuring signal level, the bias also will be a function of the measuring signal level. Therefore, it will be appreciated that the greater the measuring signal, the more its error signal will be but also the more the latter will be reduced by the automatic gain control circuit operation.

Although the automatic gain control circuit just described can be adjusted to hold the error signal quite constant over a very wide range of measuring signals, as for example, 20 to 1 in the illustrative embodiment, a further advantage which gives increased precision of measurement will result where it is necessary to measure at very low light levels. At such levels, fluctuation in the measuring signal, commonly known as noise, will be present. To reduce the tendency of the servo system to follow this noise, thus keeping the readout in constant erratic motion, it is advantageous in the use of the invention to adjust the automatic gain control so as to reduce the gain at very low signal levels while raising the gain at higher signal levels where the noise is not observed. Since this procedure would result in excessive damping at the higher signal levels, a portion of the damping signal advantageously is diverted through the damping potentiometer 160 to the AGC diode 148, where it is cut down along with the error signal being fed in over the line 26 from the photosensor and preamplifier circuitry 20. By this means, the desirable result of lowering the damping at high signal levels and increasing the damping to attenuate the noise at low signal levels is accomplished. This unique cooperation of the reference setting circuit with the damping circuit, and its cooperation in turn with the changeover between the percent transmittance and absorbance measurements, is deemed to be a highly unique and important feature of the present invention.

Again, with reference to the circuit of FIGURE 3, it can be seen that the DC potential which is used to provide the bias for controlling the damping and the gain is derived from a regulated power supply and introduced into the control network of FIGURE 3 through the line 162 and the fixed resistor 164. The latter resistor serves to isolate the DC supply so that the AC measuring signal will not be diverted from the control circuit. A second source of DC potential is derived from the 60 cycle pulsed DC line 166, applied to one end of the reference setting potentiometer 42 from a controlled reference source. The first of these two DC potential systems must maintain a constant level; this is a prime reason for making the two DC systems independent of each other which is a matter of circuit simplicity.

In accordance with a still further novel feature of the present invention, an output voltage which is accurately proportional to the percent transmittance value or the absorbance value is provided for driving an external recorder. Advantageously, this output voltage is derived from the slider 118 of the %T potentiometer 60. It is another feature of the invention that the AC signal also carried by the percent transmittance potentiometer 60 does not invalidate the accuracy of the DC voltage derived therefrom for driving the external recorder. This DC voltage is passed through a voltage divider comprised of the resistors 170 and 172 and is taken from the junction of the resistors by the output line 176 to the external recorder input. Preferably, a capacitor 174 is connected in parallel with the resistor 172 to swamp out the AC signal at the output and thereby avoid any interference by the AC signal with the action of the external recorder.

The initial level of the DC voltage at the slider 118 of the %T potentiometer is about two orders of magnitude higher than the AC voltage at this point to facilitate the rejection of the AC voltage at the recorder output line 176. The DC voltage is blocked from circuits where it is not desired, as by the use of coupling capacitors such as capacitors 124 and 178. In a similar but converse manner, the AC voltage which appears on the DC damping leads is swamped out by capacitors such as 174 shown on FIGURE 3 and capacitors 138 and 156 shown on FIGURE 4.

Those skilled in the art will readily appreciate that this novel use of accurately linear DC and AC signals in the same circuit provides a number of useful advantages. First, the presence or absence of an external recorder connected to the recorder output line 176 cannot affect the operation of the AC measuring part of the circuit. Further, this useful result is accomplished without the extra cost and complication of paralleling another linear potentiometer with the %T potentiometer 60 from which to derive the recorder voltage. Still another feature resulting from the dual use of the %T potentiometer 60 is that the output to the external recorder on the line 176 is fully linear in %T, even if the potentiometer itself for some reason becomes faulty. In this case, the digital counter readout 58 may not read out correctly but the external recorder would still provide a correct reading and recording. This linearity of the output signal to the external recorder is a particular advantage which would not be obtainable if the AC signal were to be rectified and used as an external recorder signal.

The advantage of this novel external recorder output circuit also extends to the recording of absorbance on a linear scale when the function selector 104 (FIGURE 3) is set to read out in absorbance. Since the rotation of the %T potentiometer 60 is directly proportional to the rotation and readout of the digital counter 58, and the latter is linear in the absorbance mode, so will the voltage supplied to the external recorder be linear in the absorbance mode of operation. Manifestly, this makes it completely unnecessary to use non-linear chart paper or a more expensive recorder with a linear-log conversion system to obtain linear absorbance readings. In this manner, the present invention provides a distinct and very real advantage over prior art systems which have means to operate recorders in absorbance.

There has been illustrated in the drawing and described hereinabove a highly novel spectrophotometer system which provides many advantages not obtainable with the devices disclosed or made available in the prior art. A complete circuit and wiring diagram of a spectrophotometer embodiment incorporating the present invention is illustrated in FIGURE 5 of the drawing, while the particularly novel features thereof have been further illustrated in FIGURES 2, 3, and 4 so that their novelty of construction and operation can be better understood when taken together with the description given in the above specification. In the use of the present invention, the requirement of the prior systems for removing the substituting gears to switch from percent transmittance to absorbance measurements has been completely eliminated and the present invention will permit selective operation in either measuring mode merely by the actuation of a term selector lever which serves to operate an electrical switch in a novel manner. As such, neither skill nor judgment nor consumption of time nor indexing of gears is required. Still further, the present invention provides the novel features of enabling either percent transmittance or absorbance to be read out linearly on the same digital counter readout. Still further, the present invention provides novel means to set the system to 100% transmittance or zero absorbance by merely moving a lever back and forth as well as providing novel means for producing a linear DC output voltage to an external recorder which cannot be affected by a faulty percent transmittance potentiometer.

While the above summarizes some of the outstanding and highly unique features of the present invention, those skilled in the art will readily appreciate that many other advantages in flexibility, ease of use, and speed of operation also are obtainable from the present invention.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. In a digital readout used with a photometric system, the improvement of means to provide linear photometric readout information in either percent transmittance or absorbance without mechanical conversion of the system comprising a signal source, a servo motor connected to be driven in a manner determined by said signal source, linearly operable voltage transducer means for both percent transmittance and absorbance data connected to said servo motor for movement therewith, digital readout means coupled to said voltage transducer means for indicating the percent transmittance or absorbance values thereof, means for connecting said servo motor to said voltage transducer means for causing the latter to be operated in accordance with the rotation of said servo motor by said signal source, and feedback means for selectively connecting said voltage transducer means to said signal source for reducing the drive signal to said servo motor to zero upon balance of the system whereby the measured value of the signal is indicated in either percent transmittance or absorbance values on said digital readout means.

2. A digital readout system in accordance with claim 1 wherein said digital readout means comprises a plurality of rotatable counter wheels each having digital indicia provided thereon.

3. A digital readout system in accordance with claim 2 which further comprises selectively operable switching means to switch the system from percent transmittance to absorbance readout, and a movable decimal point marker associated with said counter wheels and adapted to be moved adjacent one of said counter wheels when said switching means is set for percent transmittance readout and to be moved adjacent a different one of said counter wheels when said switching means is set for absorbance readout.

4. In a digital readout device used with a photometric system, the improvement of means to provide linear readout in either transmittance or absorbance values without mechanical conversion of the system comprising a signal source, a servo motor connected to be driven in a manner determined by said signal source, a linearly operable transmittance voltage transducer having a movable member coupled to said servo motor for movement therewith, a linearly operable absorbance voltage transducer having a movable member coupled to said servo motor for movement therewith, digital readout means coupled to the movable members of said transmittance and absorbance voltage transducers for indicating the scale positions thereof, switching means for enabling said digital readout means to selectively indicate either the measured transmittance value or the absorbance value, as desired, while the servo motor remains coupled to both of said movable members to avoid indexing problems and to maintain the mechanical accuracy of the servo system, and feedback means for selectively connecting a selected one of said movable members to said signal source for reducing the drive signal to said servo motor to zero upon balance of the system whereby the measured value of the signal is indicated on said digital readout means.

5. In a digital readout used with photometric system, the improvement of means to provide linear readout in either transmittance or absorbance values without mechanical conversion of the system comprising a signal source, a servo motor connected to be driven in a manner determined by said signal source, a linearly operable transmittance variable resistance having a movable member adapted to be coupled to said servo motor for movement therewith, a linearly operable absorbance variable resistance having a movable member adapted to be coupled to said servo motor for movement therewith, digital readout means coupled to the movable members of transmittance and absorbance variable resistances for indicating the scale positions thereof, means for coupling the output drive of said servo motor to the movable members of said transmittance and absorbance variable resistances for causing said members to be moved an amount determined by the rotation of said servo motor, feedback means for connecting one of said movable members to said signal source for reducing the drive signal to said servo motor to zero upon balance of the system whereby the measured value of the signal is indicated on said digital readout means, and selectively operable switch means for connecting either the transmittance movable member or the absorbance movable member to said feedback means as desired, said switch means also being connected to cause the rotation of said servo motor to be reversed in each of its operating states such that the servo motor rotates in one direction during transmittance measurement and rotates in the opposite direction during absorbance measurement.

6. In a digital readout used with a photometric system, the improvement of means to provide linear readout in either transmittance or absorbance values without mechanical conversion of the system comprising a signal source, a servo motor connected to be driven in a manner determined by said signal source, linearly operable variable resistance means having a movable member adapted to be coupled to said servo motor for movement therewith, digital readout means coupled to said servo motor for indicating a measured transmittance or absorbance value, selectively operable coupling means for coupling the output drive of said servo motor to either a reference position or a measuring position, said measuring position connection resulting in said movable member being moved an amount determined by the rotation of said servo motor, feedback means for selectively connecting said movable member to said signal source for reducing the drive signal to said servo motor to zero when a null point is reached upon balance of the system whereby the measured value of the signal is indicated on said digital readout means, and damping means coupled to said servo motor for bringing the servo motor to rest without overshoot when the null point is reached and the system is balanced.

7. A digital readout in accordance with claim 6 wherein said damping means comprises tachometer means operatively coupled to said servo motor for rotation therewith, said tachometer means generating a signal proportional to the angular velocity for opposing the servo motor rotation and taking over when the null point is approached to bring the servo motor to a stop without overshoot.

8. A digital readout in accordance with claim 6 wherein said damping means further comprises damping compensation means connected to said signal source for reducing damping at high signal levels and for increasing damping to attenuate noise at low signal levels.

9. A digital readout in accordance with claim 6 wherein said damping means provides a constant low degree of damping when said system is in the transmittance measuring condition and variable damping when said system is in the absorbance measuring condition.

10. A digital readout in accordance with claim 6 wherein said damping means provides variable damping when said system is in the absorbance measuring condition, said variable damping being approximately inversely proportional to the indicated absorbance.

11. In a digital readout used with photometric system, the improvement of means to provide linear readout in either transmittance or absorbance values comprising a photometric signal source, a servo motor connected to be driven in a manner determined by said signal source, a linearly operable transmittance potentiometer having a slider adapted to be coupled to said servo motor for movement therewith, a linearly operable absorbance potentiometer having a slider adapted to be coupled to said servo motor for movement therewith, digital readout means coupled to the sliders of transmittance and absorbance potentiometers for indicating the scale positions thereof, means for coupling the output drive of said servo motor to the sliders of said transmittance and absorbance potentiometers for causing the latter to be moved in accordance with the rotation of said servo motor by said signal source, feedback means for selective'y connecting one of said potentiometer sliders to said signal source for reducing the drive signal to said servo motor to zero upon balance of the system whereby the measured value of the signal is indicated on said digital readout means, selectively operable switch means for connecting either the transmittance potentiometer slider or the absorbance potentiometer slider to said feedback means as desired, said switch means also being connected to reverse the direction of rotation of said servo motor for each of its operating conditions, and an automatic reference setting potentiometer having a slider adapted to be connected to said feedback means such that its output is connected to said signal source during calibration of said system.

12. In a digital readout used with a photometric system, the improvement of means to provide linear photometric readout information in either transmittance or absorbance values comprising a photometric signal source, servo motor means connected to be driven in a manner determined by said signal source, linearly operable transmittance potentiometer means and linearly operable absorbance potentiometer means, digital readout means coupled to said transmittance and said absorbance potentiometer means for indicating the scale positions thereof, automatic reference setting potentiometer means, selectively operable switching means for connecting the output drive of said servo motor means to said transmittance and absorbance potentiometer means in one of its positions and for connecting the output drive of said servo motor means to automatic reference setting potentiometer means in another one of its positions, feedback means for selectively connecting said transmittance potentiometer or said absorbance potentiometer to said signal source for reducing the drive signal to said servo motor means to zero upon balance of the system whereby the measured value of the signal is indicated on said digital readout means, means for connecting said automatic reference setting potentiometer means to said feedback means during calibration of the system such that its output is connected to said signal source, and circuit means for making the 100% transmittance point, the zero absorbance point and the reference point equivalent to each other.

13. In a digital readout used with a photometric system, the improvement of means to provide linear photometric readout information in either transmittance or absorbance values comprising a photometric signal source, a servo motor connected to be driven in a manner determined by said signal source, a linearly operable transmittance variable resistance adapted to be coupled to said servo motor for movement therewith, digital readout means coupled to said transmittance variable resistance for indicating the scale position thereof, selectively operable coupling means for coupling the output drive of said servo motor to said transmittance variable resistance for causing the latter to be varied in accordance with the rotation of said servo motor by said signal source, feedback means for connecting the transmittance variable resistance to said signal source for reducing the drive signal to said servo motor to zero upon balance of the system whereby the measured value of the signal is indicated on said digital readout means, an automatic reference setting variable resistance, said selectively operable coupling means having an operating position for decoupling the said transmittance variable resistance from the output drive of said servo motor and for coupling said output drive to said reference setting variable resistance to effect a reference setting function of the system, voltage divider means connected to said reference setting variable resistance, and selectively operable switch means for connecting said voltage divider means to said feedback means and for disconnecting said transmittance variable resistance from said feedback means during a reference setting operation whereby said voltage divider means is substituted for said transmittance variable resistance during a reference setting operation.

14. In a digital readout used with a photometric system, the improvement of means to provide linear readout in either transmittance or absorbance without mechanical conversion of the system comprising a sample signal source, a servo motor connected to be driven in a manner determined by said signal source, a linearly operable transmittance potentiometer having a slider adapted to be coupled to said servo motor for movement therewith, a linearly operable absorbance potentiometer having a slider, a mechanical linear-log converter mechanism connected to the slider of the absorbance potentiometer and adapted to be coupled to said servo motor for movement therewith, digital readout means coupled to the sliders of said transmittance and absorbance potentiometers for indicating the measured transmittance and absorbance values of the sample signal, coupling means for coupling the output drive of said servo motor to the slider of said transmittance potentiometer and to said mechanical linear-log converter mechanism of said absorbance potentiometer to effect the operation thereof in accordance with the rotation of said servo motor by said signal source, and feedback means for selectively connecting one of said potentiometer sliders to said signal source for reducing the drive signal to said servo motor to zero upon balance of the system whereby the measured value of the sample signal is indicated on said digital readout means.

15. In a digital readout used with a photometric system, the improvement of means to provide linear readout in either transmittance or absorbance values comprising a signal source, a servo motor connected to be driven in a manner determined by said signal source, a linearly operable transmittance potentiometer having a slider adapted to be coupled to said servo motor for movement therewith, a linearly operable absorbance potentiometer having a slider adapted to be coupled to said servo motor for movement therewith, digital readout means coupled to the sliders of said transmittance and absorbance potentiometers for indicating the measured transmittance and absorbance values, coupling means for coupling the output drive of said servo motor to the sliders of said transmittance and absorbance potentiometers for causing the latter to be moved in accordance with the rotation of said servo motor by said signal source, feedback means for connecting one of said potentiometer sliders to said signal source for reducing the drive signal to said servo motor to zero upon balance of the system whereby the measured value of the signal is indicated on said digital readout means, selectively operable switch means for connecting either the transmittance potentiometer slider or the absorbance potentiometer slider to said feedback means as desired, and means connected to said transmittance potentiometer for providing an output voltage proportional to the measured percent transmittance value or the absorbance value for driving an external recorder to make a linear record of either the transmittance or absorbance value of the measured signal.

16. In a digital readout used with a photometric system, the improvement of means to provide linear readout in either transmittance or absorbance values comprising a signal source, a servo motor connected to be driven in a manner determined by said signal source, a linearly operable transmittance potentiometer having a slider adapted to be coupled to said servo motor for movement therewith, a linearly operable absorbance potentiometer having a slider adapted to be coupled to said servo motor for movement therewith, digital readout means coupled to the sliders of said transmittance and absorbance potentiometers for indicating the measured transmittance and absorbance values, coupling means having a first operative position for coupling the output drive of said servo motor to the sliders of said transmittance and absorbance potentiometers for causing the latter to be moved in accordance with the rotation of said servo motor by said signal source, feedback means for connecting one of said potentiometer sliders to said signal source for reducing the drive signal to said servo motor to zero upon balance of the system whereby the measured value of the signal is indicated on said digital readout means, selectively operable switch means for connecting either the transmittance potentiometer slider or the absorbance potentiometer slider to said feedback means as desired, an automatic reference setting potentiometer having a slider adapted to be connected to said feedback means such that its output is connected to said signal source during calibration of said system, said coupling means having a further operating position for decoupling the sliders of said transmittance and absorbance potentiometers from the output drive of said servo motor and for coupling said output drive to the slider of said reference setting potentiometer, and external recorder output means connected to said transmittance potentiometer for providing an output voltage proportional to the measured percent transmittance value or the absorbance value for driving an external recorder to make a linear record of either the transmittance or absorbance value of the measured signal.

17. In a digital readout used with a photometric system, the improvement of means to provide linear photometric readout informaton in percent transmittance and absorbance without mechanical conversion of the system, comprising a signal source, servo motor means connected to be driven in a manner determined by said signal source, linearly operable measuring potentiometer means adapted to be coupled to said servo motor means for movement therewith, automatic reference setting potentiometer means adapted to be coupled to said servo motor means for movement therewith, switching means for switching the system from a transmittance and absorbance measuring function to an automatic reference setting function, digital readout means coupled to said potentiometer means for indicating the measured transmittance and absorbance values, feedback means for connecting said potentiometer means to said signal source for reducing the drive signal to said servo motor means to zero upon balance of the system whereby the measured value of the signal is indicated on said digital readout means, and external recorder output means connected to said potentiometer means for providing an output voltage proportional to the measured value for driving an external recorder to make a linear record of the transmittance or absorbance of the measured signal.

18. A photometric system in accordance with claim 17 wherein said external recorder output means includes filter means for filtering out the A.C. signal carried by said potentiometer means such that only the D.C. voltage derived from said potentiometer means is applied to the external recorder output to thereby avoid interference by the A.C. signal with the operation of the external recorder.

References Cited

UNITED STATES PATENTS

| | | | |
|---|---|---|---|
| 2,792,542 | 5/1957 | Robinson | 324—100 X |
| 2,806,207 | 9/1957 | Edwards | 324—99 |
| 3,233,176 | 2/1966 | Iben | 340—187 X |

MAYNARD R. WILBUR, *Primary Examiner.*

G. J. MAIER, *Assistant Examiner.*